United States Patent [19]

Stembel

[11] 4,058,733
[45] Nov. 15, 1977

[54] RADIOGRAPH MARKER

[76] Inventor: Oren G. Stembel, 3132 N. Natchez, Chicago, Ill. 60634

[21] Appl. No.: 643,183

[22] Filed: Dec. 22, 1975

[51] Int. Cl.² .............................................. G03B 41/16
[52] U.S. Cl. .................................... 250/476; 354/105
[58] Field of Search ................... 250/476; 354/105, 72

[56] References Cited

U.S. PATENT DOCUMENTS

| 2,024,874 | 12/1935 | Prosperi | 250/476 |
| 3,600,577 | 8/1971 | Lovison | 250/476 |

FOREIGN PATENT DOCUMENTS

| 2,058,046 | 3/1972 | Germany | 250/476 |

Primary Examiner—Alfred E. Smith
Assistant Examiner—B. C. Anderson
Attorney, Agent, or Firm—Leydig, Voit, Osann, Mayer & Holt, Ltd.

[57] ABSTRACT

A marker for use in recording on a radiograph either of two different characters or symbols, for example an "L" or an "R" corresponding to a "left" or "right" exposure area, and for indicating the orientation of the patient during exposure. A movable element cooperates with a body member to selectively form either of the two characters or symbols. The body member also houses an orientation indicating system which provides a recordable indication of whether the marker, and hence the area of the patient exposed to the X-rays, was horizontal or vertical at the time of exposure.

15 Claims, 7 Drawing Figures

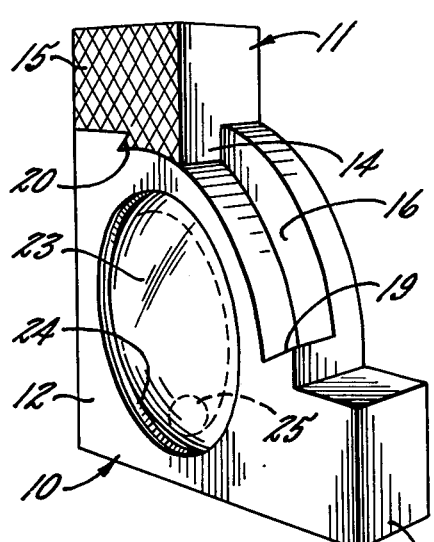
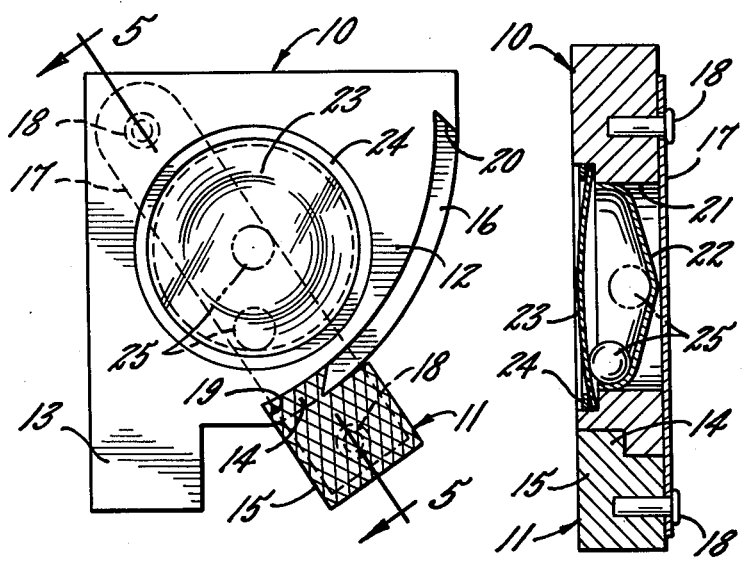
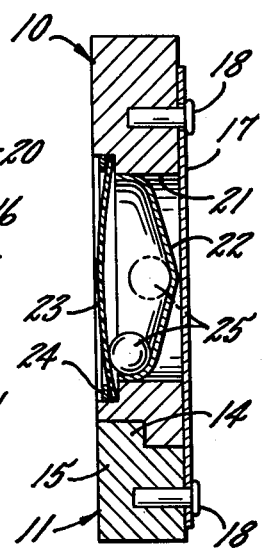
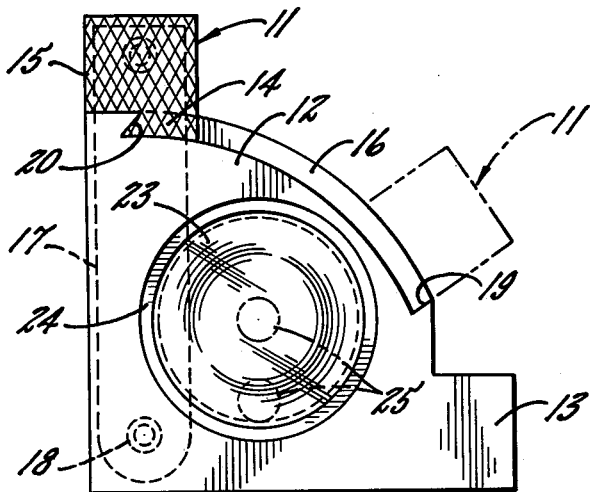
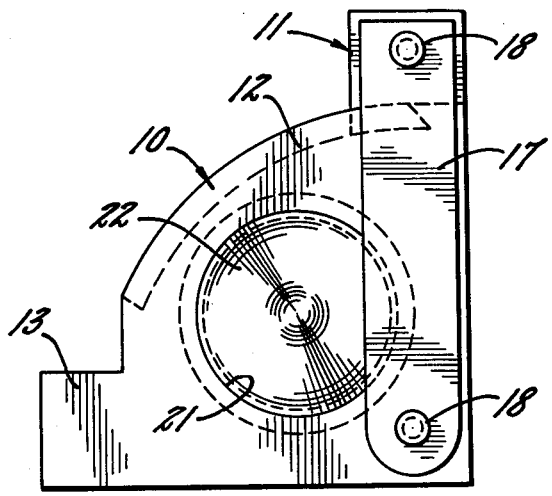
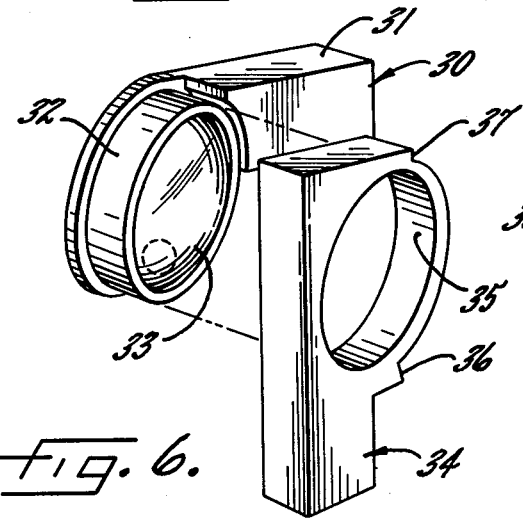
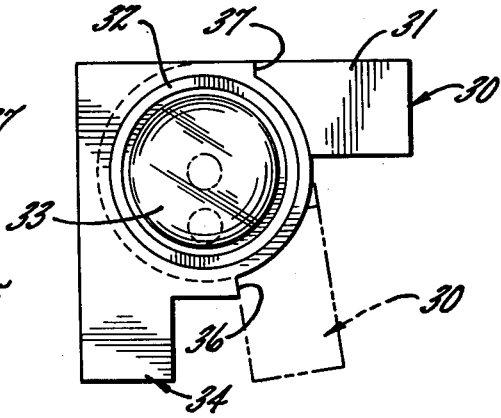

RADIOGRAPH MARKER

DESCRIPTION OF THE INVENTION

This invention relates to a radiograph marker for indicating either of two different exposure areas on the patient being X-rayed, and also whether the exposed area of the patient is in a horizontal or a vertical position.

In order to reliably identify which of two areas, e.g., right or left, is shown on a radiograph and also to indicate the orientation of the exposed area, e.g., whether the patient was lying or standing, it is desirable to record the information on the radiograph film at the time of exposure. Heretofore, the identification of the exposure area has been accomplished by placing a lead character or symbol, e.g., "R" or "L", between the X-ray source and the unexposed film and then exposing the film in the normal fashion. The area under the lead character is shielded from the X-rays and, therefore, remains relatively unexposed, providing the desired exposure identification upon development of the film. To identify the orientation of the patient, it is known to use a freely movable member of lead or mercury confined in a relatively X-ray transparent, conical cavity within the lead marker. By noting the position of the movable member in the cavity, the direction of gravitational pull and hence the orientation of the patient, may be determined from the resulting radiograph. The so-called "Mitchell marker" employs this technique.

The above described systems all require at least two markers, one corresponding to each of the characters or symbols required to be recorded on the radiograph film. This is a disadvantage from the handling point of view in that the X-ray operator must have each marker at hand and available at all times to assure that the character or symbol corresponding to a particular exposure is available, even though only one marker may be required for any given exposure area.

Accordingly, a principal object of the present invention is to eliminate the need for a separate radiograph marker for each different exposure area.

An additional object of the invention is to provide a single radiograph marker which is capable of selectively indicating either of two exposure positions while also indicating the orientation of the patient at the time of exposure.

A further object of the invention is to provide such an improved radiograph marker which can be efficiently and economically manufactured.

Other objects and advantages of the present invention will be apparent from the following detailed description taken in conjunction with the accompanying drawings, in which:

FIG. 1 is a perspective view of a radiograph marker embodying the present invention;

FIG. 2 is a top plan view of the marker of FIG. 1 in the "L" configuration with the "R" configuration shown in broken lines;

FIG. 3 is a top plan view of the marker of FIG. 1 in the "R" configuration;

FIG. 4 is a bottom plan view of the marker of FIG. 1;

FIG. 5 is a section taken substantially along line 5—5 in FIG. 2;

FIG. 6 is an exploded perspective view of an alternative radiograph marker embodying the invention; and FIG. 7 is a top plan view of the marker of FIG. 6 in the "L" configuration, with the "R" configuration shown in broken lines.

While the invention will be described in connection with certain preferred embodiments, it will be understood that it is not intended to limit the invention to those particular embodiments. On the contrary, it is intended to cover all alternatives, modifications and equivalents as may be included within the spirit and scope of the invention as defined by the appended claims.

Turning now to the drawings and referring first to FIGS. 1 through 5, there is shown one embodiment of a radiograph marker embodying the present invention. A body member 10 forms the common elements of an "L" and an "R" and also houses an orientation indicating element which will be described in detail below. To supplement the character outline of the body member 10, there is provided a selectively positionable slider element 11. In the embodiment shown, the profile of the body member 10 is a substantially 90° sector 12 of a circle having its center of curvature near the corner of a right-angle portion formed as an integral part of the sector 12 and having a leg 13 projecting from one end thereof. The profile of the slider element 11 is substantially square, corresponding in size to the leg 13 of the body member 10. As shown in FIGS. 1 and 2, the body member 10 may be viewed as forming the horizontal leg and a substantial part of the vertical leg of an "L" such that when supplemented by the slider element 11 at one end of its path, the two components generally define a complete "L". In contrast, as shown in FIG. 3, the body member 10 may be oriented such that is is viewed as outlining substantially a "P", with the result that an "R" is formed with the slider element at the other end of its path, in the position shown in FIG. 3.

The outline-defining portions of the body member 10 and the slider element 11 are made of a relatively X-ray-opaque material, e.g., lead, such that by interposing the marker between the X-ray source and the X-ray sensitive film, as by placing the marker on the plate containing the film, the configuration of the marker, whether it be an "L" or a "R", will be recorded upon exposure of the film.

In order to describe the slider 11 in more detail, and to show the inter-relationship and cooperation between the slider 11 and the body member 10, reference is made particularly to FIG. 1. The thicknesses of the body member 10 and the slider 11 are substantially equal, corresponding roughly to the facial dimensions of the leg 13 of the body member 10 and the slider 11. To support the slider 11 on the body member 10, the inboard edge of the slider has a projection 14 meshing with a corresponding arcuate recess 16 formed in a portion of the periphery of the arcuate sector 12 of the body member 10. As best shown in FIGS. 4 and 5, the slider 11 is fastened to a link 17 that is journaled on a pin anchored in the body member 10 at the center of curvature of the arcuate sector 12, thereby confining the slider 11 to travel in the arcuate recess 16 along the periphery of the sector 12. The interaction of the end surfaces 19 and 20 of the recess 16 with the projection 14 of the slider 11 limit the travel of the slider 11 to the positions shown in FIGS. 2 and 3. That is, the limit positions of the slider 11 represent the "L" and "R" positions, as illustrated in FIGS. 2 and 3, respectively.

For the purpose of providing a recordable indication of whether the radiograph marker and, hence the radiograph, is lying horizontally or vertically at the time of exposure, a gravity sensitive indicator is situated in a circular opening 21 in the body member 10. As best illustrated in FIG. 5, this indicator comprises a circular, concave dish 22 formed from a relatively X-ray transparent material such as aluminum. The dish 22 may be secured in the circular opeining 21 through the use of an adhesive and/or by sizing the outside diameter of the dish to require a press fit into the circular opening. A relatively X-ray transparent lens 23, which is preferably also optically transparent to permit visual observation of the system, cooperates with the dish 22 to define an enclosed chamber. A friction-fitting retaining ring 24 serves to secure the lens 23 in position against a flange (see FIG. 5) formed above the dish 22.

To provide an indication of the orientation of the marker, a freely movable, relatively X-ray-opaque member 25, e.g., a lead ball or a drop of mercury, is confined within the chamber between the dish 22 and lens 23. It will be appreciated that with the marker in a vertical position as shown in FIGS. 1 and 5, the movable member 25 will assume the position shown in FIG. 5, at the periphery of the dish 22. On the other hand, with the marker lying in a horizontal position, the movable member 25 will move to the center of the dish 22, as shown by the broken lines in FIGS. 2, 3 and 5. In this manner, the movable member 25 serves to provide a recordable indication of the orientation of the marker. It will be further appreciated that in addition to indicating when the marker is in a vertical position, the marker also indicates the specific direction of gravitational pull by allowing the movable member 25 to seek the lowest point around the periphery of the dish 22.

A second embodiment of the invention is illustrated in FIGS. 6 and 7. In this embodiment a body member 30 has a leg 31 and an integral cylindrical projection 32 housing an orientation indicating system similar to the one described above in connection with the first embodiment and generally indicated at 33. To permit the configuration of the marker to selectively correspond to either an "L" or an "R", there is provided a slider element 34 substantially forming a "P" and having a circular opening 35 adapted to telescope over the cylindrical projection 32 of the body member 30. Stop surfaces 36 and 37 serve to limit the travel of the body member and the slider element 34 relative to one another. As illustrated in FIG. 7, and "L" is formed when the leg 31 is at one limit position shown by the solid lines, while an "R" is formed when the leg 31 is in the other limit position illustrated in broken lines.

Although the invention has been described with specific reference to radiograph markers that are capable of forming either an "L" or an "R", it will be recognized that the principle is applicable to other combinations of two or more characters. For example, a single marker could form both a "D" and a "G" (abbreviations used for droite (right) and gauche (left) on radiographs in France) by pivoting a portion of the straight vertical leg of a D-shaped element for movement through a 90° arc to a horizontal position perpendicular to the other portion of the straight vertical leg of the "D", thereby forming a "G". Similarly, a single marker could form both an "A" and a "P" (abbreviations for "anterior" and "posterior") by connecting a P-shaped element to a straight elemen movable between a first position overlying the post of the P and a second position.

While the invention has been described with specific reference to the use of X-rays, it should be understood that the invention is equally applicable to body image records produced by subjecting sensing media to other forms of radiation emanating from a body. As used herein, the term "emanating" is to be understood to include radiant energy that originates in the body, as in thermography; radiant energy that is reflected by the body, as in ultrasonic scanning; or radiant energy that is transmitted through the body, as in X-rays.

I claim as my invention:

1. A radiograph marker comprising a pair of elements made of a relatively X-ray opaque material and interconnected in a manner to permit relative movement between the two elements, said elements being shaped to form a first letter when in a first position relative to each other and to form a second letter when in a second position relative to each other whereby the same marker can be used to form either of two different letters when placed between an X-ray source and a radiograph film, and gravity responsive means within one of said elements for indicating whether the marker is in a horizontal or vertical position.

2. A radiograph marker comprising a pair of elements made of a relatively X-ray-opaque material and interconnected in a manner to permit relative movement between the two elements, one of said elements being connected to the other element so that said one element forms a portion of one of the legs of an "L" in a first position and the diagonal leg of an "R" in a second position, the other of said elements forming the balance of the "L" in said first position and the balance of the "R" in said second position whereby the same marker can be used to form either an "L" or an "R" when placed between an X-ray source and a radiograph film.

3. A radiograph marker as set forth in claim 2 wherein said other element forms a positive stop for said one element at said first and second positions.

4. A radiograph marker as set forth in claim 1 wherein said gravity responsive means is located in an aperture in a portion of one of said elements, said aperture forming a portion of the outline of at least one of said letters.

5. A radiograph marker as set forth in claim 4 wherein said elements are interconnected by a link which extends across said aperture and is made of a relatively X-ray transparent material.

6. A radiograph marker as set forth in claim 1 wherein said gravity responsive means comprises an aperture formed in one of said elements and containing a movable indicator between two closure members which hold the movable indicator captive within the cavity formed by said closure members, at least one of said closure members forming a surface which guides the movable indicator to the center of said cavity when the marker is in a horizontal position and to the periphery of said cavity when the marker is in a vertical position.

7. A method of marking a radiograph with a letter, said method comprising positioning between the X-ray source and the radiograph film a marker comprising a pair of elements made of a relatively X-ray-opaque material and interconnected in a manner to permit relative movement between the two elements, said elements being shaped to form a first letter when in a first position relative to each other and to form a second letter when in a second position relative to each other whereby the same marker can be used to form either of two different letters, and gravity responsive means within one of said elements for indicating whether the marker is in a horizontal or vertical position.

8. A method of marking a radiograph with a letter, said method comprising positioning between the X-ray source and the radiograph film a marker comprising a pair of elements made of a relatively X-ray-opaque material and interconnected in a manner to permit relative movement between the two elements, one of said elements being connected to the other element so that said one element forms a portion of one of the legs of an "L" in a first position and the diagonal leg of an "R" in a second position, the other of said elements forming the balance of the "L" in said first position and the balance of the "R" in said second position whereby the same marker can be used to form either an "L" or an "R" when placed between an X-ray source and a radiograph film.

9. A method of marking a radiograph as set forth in claim 7 wherein said gravity responsive means is located in an aperture in a portion of one of said elements, said aperture forming a portion of the outline of at least one of said letters.

10. A method of marking a radiograph as set forth in claim 7 wherein said gravity responsive means includes an aperture formed in one of said elements and containing a movable indicator between two closure members which hold the movable indicator captive within the cavity formed by said closure members, at least one of said closure members forming a surface which guides the movable indicator to the center of said cavity when the marker is in a horizontal position and to the periphery of said cavity when the marker is in a vertical position.

11. A marker for a body image record formed by subjecting a sensing medium to a selected form of radiation emanating from a body, said marker comprising a pair of elements made of a material which influences said selected form of radiation when the marker is placed between the body and the sensing medium, said elements being interconnected in a manner to permit relative movement between the two elements with the elements being shaped to form a first letter when in a first position relative to each other and to form a second letter when in a second position relative to each other whereby the same marker can be used to form either of two different letters, and gravity responsive means within one of said elements for indicating whether the marker is in a horizontal or vertical position.

12. A marker for a body image record formed by subjecting a sensing medium to a selected form of radiation emanating from a body, said marker comprising a pair of elements made of material which influences said selected form of radiation, said elements being interconnected to permit relative movement between the two elements with the elements being shaped to form an "L" when in a first position relative to each other and to form an "R" when in a second position relative to each other whereby the same marker can be used to form either an "L" or an "R", one of said elements forming a portion of one of the legs of the "L" in said first position and the diagonal leg of the "R" in said second position.

13. A radiograph marker comprising a pair of elements made of a relatively X-ray opaque material and interconnected in a manner to permit relative movement between the two elements, said elements being shaped to form a first letter when in a first position relative to each other and to form a second letter when in a second position relative to each other whereby the same marker can be used to form either of two different letters when placed between an X-ray source and a radiograph film, one of said elements forming a positive stop for the other of said elements in both the first and second positions to form said two different letters.

14. A method of marking a radiograph with a letter, said method comprising positioning between the X-ray source and the radiograph film a marker comprising a pair of elements made of a relatively X-ray-opaque material and interconnected in a manner to permit relative movement between the two elements, said elements being shaped to form a first letter when in a first position relative to each other and to form a second letter when in a second position relative to each other whereby the same marker can be used to form either of two different letters, one of said elements forming a positive stop for the other of said elements in both the first and second positions to form said two different letters.

15. A marker for a body image record formed by subjecting a sensing medium to a selected form of radiation emanating from a body, said marker comprising a pair of elements made of a material which influences said selected form of radiation when the marker is placed between the body and the sensing medium, said elements being interconnected in a manner to permit relative movement between the two elements with the elements being shaped to form a first letter when in a first position relative to each other and to form a second letter when in a second position relative to each other whereby the same marker can be used to form either of two different letters, one of said elements forming a positive stop for the other of said elements in both the first and second positions to form said two different letters.

* * * * *